Oct. 10, 1944.　　　A. C. KOETT　　　2,360,144

DRILL CHUCK

Filed April 24, 1943

INVENTOR.
BY Albert C. Koett
Wood, Arey, Herron & Evans
Attorneys

Patented Oct. 10, 1944

2,360,144

UNITED STATES PATENT OFFICE 2,360,144

DRILL CHUCK

Albert C. Koett, Cincinnati, Ohio, assignor to The Kett Tool Company, Cincinnati, Ohio, a corporation of Ohio Application April 24, 1943, Serial No. 484,367

4 Claims. (Cl. 279—64)

This invention concerns chucks for holding drills and bits. It is disclosed particularly in relation to small and compact chucks occupying as little space as possible for enabling holes to be drilled conveniently in quarters where only limited space is available.

The present application is a continuation in part of my application Serial No. 457,164 in which a drill chuck is disclosed consisting essentially of a body having bores in it which are arranged radially on an angle to hold chuck jaws and a cap fitting over the nose of the body for pushing the jaws downwardly and radially inwardly for closure of the chuck. In the chuck disclosed in the copending application compression springs are located underneath the chuck jaws for moving them outwardly as the cap is unscrewed.

These units on the whole are small, very compact and especially suitable for use in many spaces where a chuck of conventional construction could not be utilized. However, during their daily use it has been the experience that the unskilled workman, inserting a drill into the chuck, may push the back end of the drill against the springs and break or damage them, and once this occurs, the operation of the unit is impaired. On the other hand, the small compression springs tend to become fatigued after a period of use and either break of their own accord or lack the desired compression to thrust the jaws toward open position as the cap is unscrewed. Some difficulty also is encountered in holding securely drills corresponding substantially in diameter to the maximum chuck opening, since the chuck jaws can grasp such drills only at the back part of the shank and this portion of the shank is sometimes galled so badly that it is actually tapered slightly. Yet, drills of the maximum size require the firmest grip of the chuck.

To overcome these difficulties a principal objective of the present invention has been to provide a chuck in which the jaws are actuated by a single spring or thrust element which is proportioned to resist fatigue.

A further objective has been to provide a structure in which the jaws grip the drill over a substantial portion of the rear part of the shank, or at a portion of its shank which is spaced inwardly from its back end, and thereby obtain a good purchase upon it.

The objective furthermore has been to provide a chuck in which the jaw actuating spring is concealed against damage caused by an operator inadvertently pushing the shank of a drill against it.

A further objective of the invention has been to provide means for preventing inadvertent removal of the chuck cap from the body.

Other objects of the invention and further features of the improved structure are disclosed in the accompanying drawing in which a preferred embodiment of the invention is illustrated.

Figure 1:
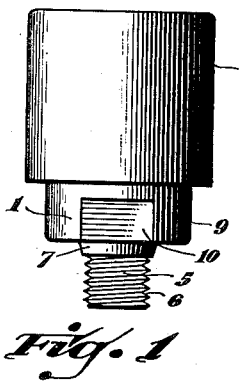
Figure 1 is an elevation of the chuck.
Figures 2, 8:
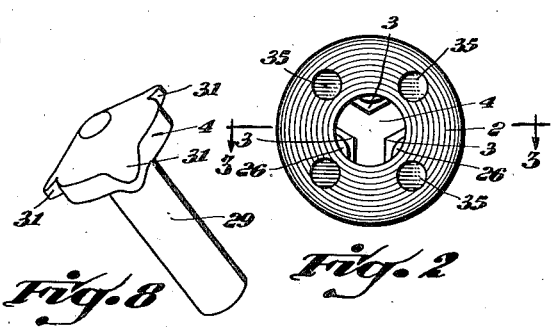
Figure 2 is a plan view of the chuck cap.
Figure 8 is a perspective view of the thrust element for actuating the jaws toward open position under the influence of a spring.
Figure 3:
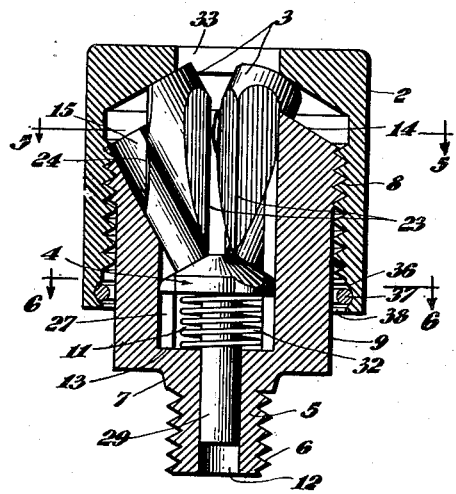
Figure 3 is a sectional view taken on the line 3—3 of Figure 2. This view shows the chuck jaws in an intermediate position.

The chuck shown in the drawings is a chuck suitable for handling drills or tool bits up to one-quarter inch shank diameter, and Figures 1 and 2 are twice the size of a typical chuck of the present invention as produced commercially while Figures 3 to 8 are three times actual size. However, though these small sized chucks are selected for illustration, the invention is also suitable for chucks of larger capacity.

The chuck shown in the drawing consists generally of a body 1, a cap 2, a series of jaws 3 riding on an angle within the body and a spring actuated pusher element 4 for urging the jaws toward an open position against the influence of the cap which moves them to a closed position.

The chuck body is a cylindrical piece having a shank 5 which is threaded, as at 6, for reception of the chuck in a drive spindle. At the juncture of the shank with the main body portion a tapered shoulder 7 is provided which, fitting into a similarly configurated tapered bore in the spindle of the driving tool, insures concentricity of the body with the drive tool.

The forward portion of the body is threaded, as at 8, to receive the cap, leaving an unthreaded portion 9 at the back part of the main portion of the body at which flats 10 are provided. A wrench may be placed over the flats to tighten the body on the drive spindle or to hold the chuck while the jaws are being tightened.

The body 1 has a bore 11 passing concentrically into it from its forward end. A bore 12 of smaller diameter passes on down through the shank 5 leaving a substantially flat seat 13 within the body at the back part of it. The forward portion of the body has a conical nose 14.

Bore 11 preferably corresponds substantially in diameter to the diameter of the maximum size drill or bit the chuck is adapted to receive and jaw slots 15, spaced radially from one another, extend from the nose 14 into the chuck body on an angle toward the bore 11.

In the preferred structure the slots 15 are configurated to receive the jaws shown in Figure 8. In this construction, each slot consists of bore portion 16 of relatively large diameter communicating with another bore portion 17 of smaller diameter, the portion 17 in turn communicating with the main concentric bore 11 of the body. These jaw slots converge symmetrically upon the axis of the bore 11.

It will be seen that the differences in diameter between the bores 16 and 17 provide, between them, constrictions 18 which, referring to Figure 8, fit in the nips or grooves 19 of the chuck jaws and therefore confine the jaws to sliding movement only in the jaw slots.

The jaws themselves are similar to those disclosed in the copending application, are preferably composed of two sections, and may, if desirable, be made of two substantially cylindrical pieces, a small one 20 and a large one 21, joined together longitudinally. These pieces are cut angularly along the front or inner face 23, and outer face 24, the portion 21 having clearance surfaces 25—25 at opposite sides of the tool engaging surface 23, so that the clearances 25 permit the jaws to be brought against one another whereby the holding surfaces 23 all substantially meet one another. This enables small diameter drills and bits to be received and held.

The upper or outer portions of the chuck jaws are arcuately configurated, as at 26, on an angle corresponding substantially to the taper of the body nose 14. The lower surfaces 22 at the other end of the chuck jaws, in the preferred embodiment of the invention, are substantially normal to an axis passing along the nip 19.

In accordance with the present invention, the body 1 has a series of slots 27 cut in it parallel with the axis of the bore 11 but spaced outwardly beyond it. These slots extend from the respective jaw slots 15 back into the body to substantially the seat 13. These slots constitute guiding grooves and are shown best in Figure 6.

A presser plate or thrust element 4 is provided at the rearward portion of the bore 11 and it has a shank 29 which passes backwardly through the bore 12 in the shank of the chuck body. The front part of the presser plate corresponds substantially to the diameter of the bore 11 but at its outer periphery it also has nibs 31 which ride within and are guided by the slots 27. The presser plate, at its endwise portion within the chuck body, is of conical configuration, the angle of conicality being such that its surface is substantially normal to the axis of the jaw slots for engagement thereof with the rearward portions 22 of the chuck jaws.

A thrust spring 32 is interposed around the shank 29 of the presser element between the seat 13 of the body and the back face of the presser plate to urge the plate forwardly, thereby tending to thrust the jaws toward a forward, open position.

As the jaws move outwardly along their slots, the lower surfaces 20 of the jaws slide radially outwardly across the conical surface of the presser plate. This action, without the nibs, could continue only until the jaw edges 23 reach the periphery of bore 11. However, the nibs provide additional thrusting surfaces which come into play when the jaws are at substantially their outermost position, that is, when the surfaces 23 of the jaws are about to pass beyond the confines of the bore 11. Therefore, these nibs, while not used normally when the jaws are substantially closed, provide surfaces through which the jaws may be urged to a position even beyond that of the confines of the bore 11. This arrangement permits full utilization of drills or tool bits of a maximum size which just fit within the bore 11. This arrangement also is preferred because it provides a suitable and simple means for keeping the presser plate in place; without the nibs engaging the jaw it would spring out into the jaw cavity if the chuck inadvertently were open to its widest possible position.

The cap 2 of the device is bored and threaded to fit down over the body but the end of the bore is tapered to correspond substantially to the arcuate surfaces 26 of the chuck jaws, these surfaces, like the surface 20, also preferably being sustantially normal to the longitudinal axis of the jaws. The cap has a central bore 33 located in its portion through which tools may be passed into the body of the chuck. The outer face of the cap has spanner sockets 35 for receiving a wrench through which the cap may be tightened. The rear part of the cap is dimensioned to extend beyond the threads 8 of the body when the cap is in its outermost position and has an annular groove 36 cut in this portion of it. An expanding split ring 37 fits within the groove extending into the path of the body threads 8, and prevents the cap from being taken from the body inadvertently. To enable the ring to be installed and removed from its normal position on the cap the relative dimensions of the ring, body, groove 36 and back part of the cap are such that an annular clearance space 38 is provided which is slightly larger than the cross sectional diameter of the ring, whereby the ring may be passed through the clearance space into the groove. To take the ring out of place a pointed tool is simply inserted at the split of the ring to urge the ring inwardly until it may be grasped.

Figure 4:
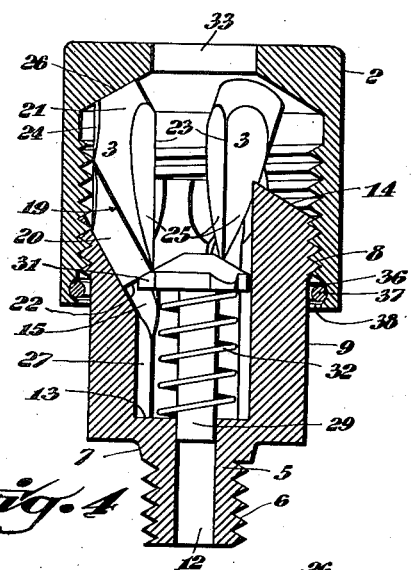
Figure 4 is a view similar to Figure 3 showing the jaws in an open position.
Figure 5:
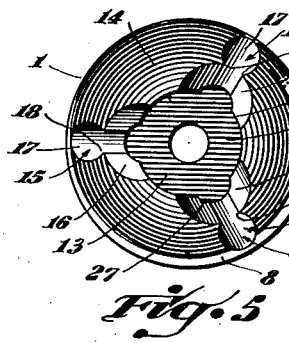
Figure 5 is a sectional view taken on the line 5—5 of Figure 3.
Figure 6:
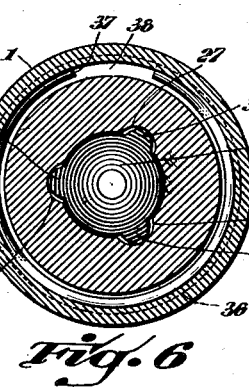
Figure 6 is a sectional view taken on the line 6—6 of Figure 3.
Figure 7:
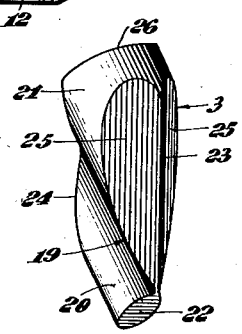
Figure 7 is a perspective view of one of the chuck jaws.

Figure 4 illustrates the relative position of the jaws of the chuck when they are in an openmost position. In this case the surfaces 20 of the jaws are riding and supported by the nibs 31 of the presser plate while the other ends of the jaws engage the conical surface of the cap. As the cap is screwed backwardly the jaws, riding in their slots, are moved longitudinally of the body and also move radially inwardly through angulation of the jaw slots. During this action the surfaces 26 ride inwardly across the conical surface of the cap of the chuck while the surfaces 20 at the other ends of the jaws ride up the conical surface of the presser plate, simultaneously compressing the spring 32.

It is preferable that the shank 29 of the presser plate terminate at substantially the end of the shank 5 of the chuck body, when the chuck is in a closed position to eliminate any necessity for counterboring the drive tool to provide a recess within which the shank 29 may be received when the chuck is closed. The shank therefore during open, closed and intermediate positions acts as a pilot for the presser plate and prevents it from canting or becoming tilted in its cavity.

When the jaws are in their openmost position the spring plate is most relaxed. A drill of the largest possible size may therefore be inserted into the chuck not only until the end of its shank hits the presser plate, but the presser plate itself may be moved backwardly until the spring is substantially compressed whereby the drill is positioned relative to the chuck jaws so that they engage it at a portion spaced inwardly from its rear end. This arrangement therefore permits the jaws to obtain a purchase upon the shank throughout their entire length and provides a rigid grip through which drills of substantial size may be held firmly.

Having described my invention, I claim:

1. In a chuck having a bored out body and a plurality of jaws slidably mounted therein on angles converging toward the axis of the bore, and having slots residing outwardly beyond said body bore and communicating with the inward portions of said chuck jaws, a thrust member arranged to engage the inward ends of said jaws, said thrust member having projections riding in said slots for maintaining contact with the ends of said jaws, spring means for actuating said thrust member and a cap carried by said body for actuating said jaws against said spring means.

2. In a drill chuck comprising a body having a shank, said body having a bore concentrically disposed therein and said shank having a bore of lesser diameter communicating with the body bore and, chuck jaws slidably mounted in said body on angles converging on the axis of said body bore, a thrust member having a pilot portion slidable within said shank bore and a nose for engaging the inner ends of said chuck jaws, said body having slots therein residing outwardly beyond said body bore and communicating with said chuck jaws and said thrust member having projections thereon extending into said slots for maintaining contact with said chuck jaws, means for actuating the said thrust member and a cap carried by said body for actuating said jaws against said thrust member.

3. In a chuck comprising a body having a concentric bore and having inclined guideways converging on the axis of the bore from the open end thereof, and having additional guideways extending beyond the bore thereof and substantially parallel therewith in communication with the inclined guideways jaws movable in said inclined guideways, means including a thrust member having portions thereof residing in said second named guideways for engaging said chuck jaws, and means adjustably mounted on the body for moving the jaws along the guideways against said thrust means.

4. In a chuck comprising a body having jaw slots converging upon the axis of the body from the open end thereof, and jaws slidable in the respective slots, a thrust member having a conical face which is substantially normal to the axes of said jaw slots engaging the inward ends of said jaws, a spring for actuating said thrust member, said body having guideways arranged around said thrust member and communicating with said jaw slots, said thrust member having portions extending from its periphery into said guideways for maintaining contact of said thrust member with said jaws, and a member adjustably carried by said body for actuating said jaws against said thrust member.

ALBERT C. KOETT.